US 8,027,445 B2

(12) United States Patent
Ku et al.

(10) Patent No.: US 8,027,445 B2
(45) Date of Patent: Sep. 27, 2011

(54) METHOD AND SYSTEM TO PROVISION EMERGENCY CONTACT SERVICES IN A COMMUNICATION NETWORK

(75) Inventors: Bernard Ku, Austin, TX (US); Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 993 days.

(21) Appl. No.: 11/936,410

(22) Filed: Nov. 7, 2007

(65) Prior Publication Data

US 2009/0116623 A1 May 7, 2009

(51) Int. Cl.
*H04M 3/42* (2006.01)
(52) U.S. Cl. .................. 379/201.02; 379/37; 379/201.12
(58) Field of Classification Search .................. None
See application file for complete search history.

(56) References Cited

U.S. PATENT DOCUMENTS

| | | | |
|---|---|---|---|
| 3,428,750 A | 2/1969 | Hoffman | |
| 3,478,174 A | 11/1969 | MacLeod et al. | |
| 3,787,632 A | 1/1974 | Male et al. | |
| 6,161,008 A | 12/2000 | Lee | |
| 6,694,004 B1 | 2/2004 | Knoerle | |
| 6,697,478 B1 | 2/2004 | Meldrum | |
| 6,816,582 B2 | 11/2004 | Levine | |
| 6,839,421 B2 * | 1/2005 | Ferraro Esparza et al. | 379/220.01 |
| 6,978,003 B1 | 12/2005 | Sylvain | |
| 7,027,582 B2 * | 4/2006 | Khello et al. | 379/220.01 |
| 7,944,912 B2 * | 5/2011 | Kobayashi et al. | 370/352 |
| 2003/0097485 A1 | 5/2003 | Horvitz | |
| 2003/0128693 A1 | 7/2003 | Segal | |
| 2003/0131069 A1 | 7/2003 | Lucovsky | |
| 2003/0131142 A1 | 7/2003 | Horvitz | |
| 2004/0003114 A1 | 1/2004 | Adamczyk | |
| 2004/0047341 A1 | 3/2004 | Staack | |
| 2005/0195802 A1 | 9/2005 | Klein | |
| 2005/0195954 A1 | 9/2005 | Klein | |
| 2005/0201362 A1 | 9/2005 | Klein | |
| 2005/0207402 A1 | 9/2005 | Kobayashi | |
| 2006/0036642 A1 | 2/2006 | Horvitz | |
| 2006/0072726 A1 | 4/2006 | Klein | |
| 2006/0077965 A1 | 4/2006 | Garcia-Martin | |
| 2006/0120362 A1 | 6/2006 | Westman et al. | |
| 2006/0167977 A1 | 7/2006 | Wu | |
| 2006/0195460 A1 | 8/2006 | Nori et al. | |
| 2006/0209690 A1 | 9/2006 | Brooke | |
| 2007/0019623 A1 | 1/2007 | Alt | |

(Continued)

OTHER PUBLICATIONS

Mealling, M. and Daniel, R. "The Naming Authority Pointer (NAPTR) DNS Resource Record", Request for Comments: 2915, Sep. 2000, 17 pp.

(Continued)

*Primary Examiner* — Harry Hong
(74) *Attorney, Agent, or Firm* — Toler Law Group

(57) ABSTRACT

A method includes receiving a query at a telephone number mapping (ENUM) server, the query identifying an emergency telephone number associated with a subscriber to an emergency contact service. The method also includes retrieving from the ENUM server, in response to the query, one or more emergency contact Uniform Resource Identifiers (URIs) associated with the subscriber, where each of the emergency contact URIs has an associated emergency contact indicator. The method also includes initiating routing of a communication to destination devices associated with each retrieved emergency contact URI via an Internet Protocol Multimedia Subsystem (IMS).

25 Claims, 11 Drawing Sheets

U.S. PATENT DOCUMENTS

| | | |
|---|---|---|
| 2007/0043829 A1 | 2/2007 | Dua |
| 2007/0106612 A1 | 5/2007 | O'Brien et al. |
| 2007/0116250 A1 | 5/2007 | Stafford |
| 2007/0129108 A1 | 6/2007 | Swanburg |
| 2008/0146201 A1 | 6/2008 | O'Neill et al. |
| 2008/0317000 A1 | 12/2008 | Jackson |
| 2009/0040923 A1 | 2/2009 | Bantukul |
| 2009/0122793 A1* | 5/2009 | Yang .............................. 370/352 |

OTHER PUBLICATIONS

Faltstrom, P. "The E.164 to Uniform Resource Identifiers (URI) Dynamic Delegation Discovery System (DDDS) Application (ENUM)", Request for Comments: 3761, Apr. 2004, 17 pp.

Faltstrom, P. "E.164 Number and DNS", Request for Comments: 2916, Sep. 2000, 10 pp.

* cited by examiner

METHOD AND SYSTEM TO PROVISION EMERGENCY CONTACT SERVICES IN A COMMUNICATION NETWORK

FIELD OF THE DISCLOSURE

The present disclosure is generally related to a method and system to provision emergency contact services.

BACKGROUND

Provisioning emergency contact services in a communication network typically involves multiple work flows and steps, and often involves a large coordination effort. It can be a tedious, time consuming and error prone process that may involve changes to several systems, such as central data storage Private Branch Exchange (PBX) systems, Advanced Intelligent Network (AIN) triggers, Central Office switch logic, and SS7 internetworking systems. Hence, there is a need for an improved method and system to provision emergency contact services in a communication network.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings may indicate similar or identical items.

DETAILED DESCRIPTION

Figure 1:
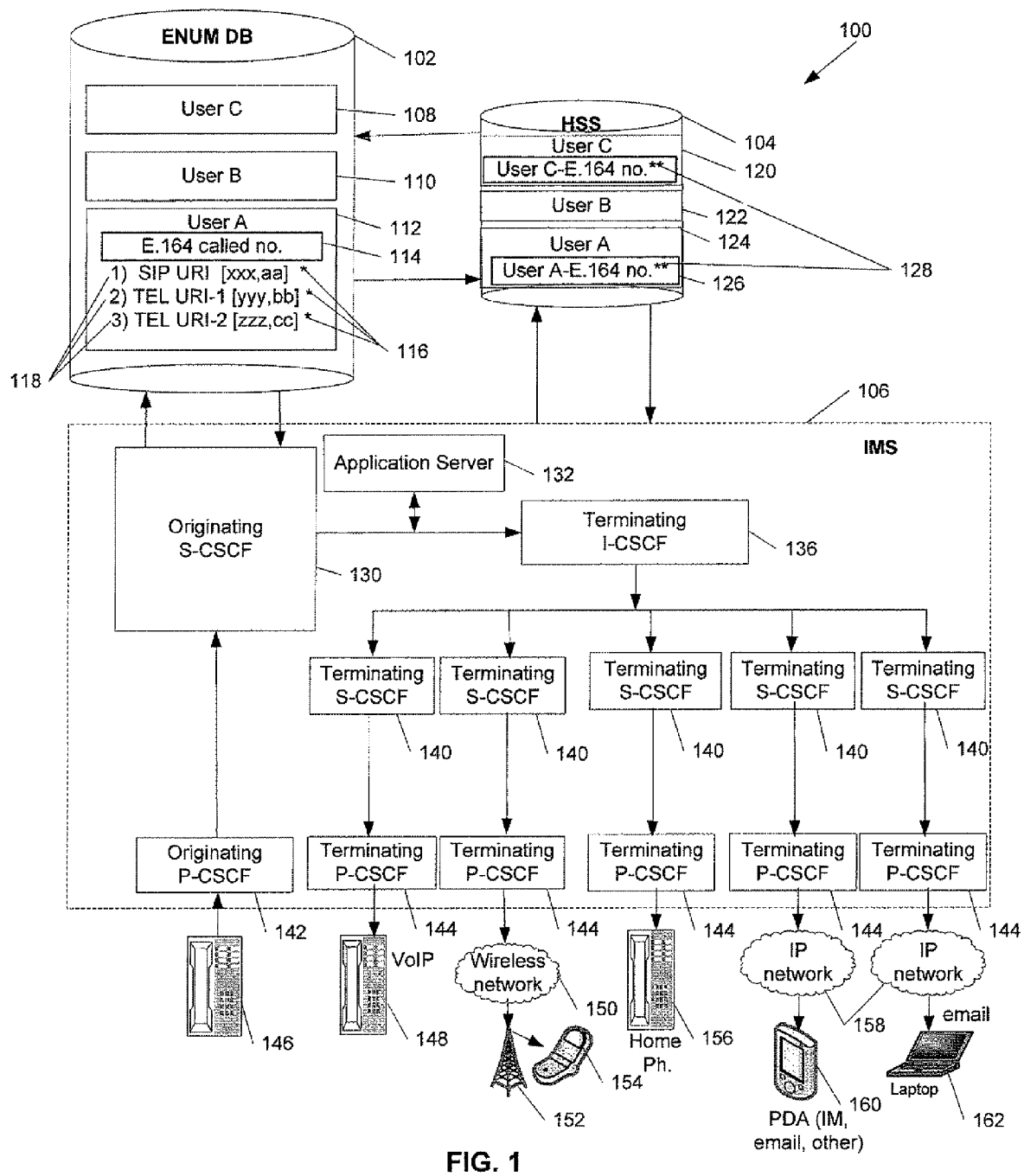
FIG. 1 is a diagram of a particular illustrative embodiment of a system to provision emergency contact services in a communication network.

The disclosure is generally directed to a system and method to provision emergency contact services in a communication network. In a particular embodiment, the system includes an Internet Protocol Multimedia Subsystem (IMS) that includes a telephone number mapping (ENUM) server and a Home Subscriber Server (HSS). The ENUM server can communicate with the HSS. The ENUM server includes a plurality of records, and typically includes one record for each subscriber to an emergency contact service. A record may include one or more Uniform Resource Indicators (URIs) associated with an emergency E.164 telephone number that is associated with a particular user. Each URI may have a corresponding emergency indicator for indicating that the particular URI is associated with a corresponding emergency destination device. The HSS may maintain a user record for each user, and the user record may include an emergency identifier to identify the associated E.164 number as an active emergency telephone number associated with the user when the user is a subscriber to an emergency contact service. During operation, the IMS may receive a phone call to the E.164 emergency phone number, and may retrieve corresponding URIs from the ENUM server after the ENUM server has verified that the E.164 phone number is an actively registered emergency phone number. The IMS may proceed to contact the associated emergency destination devices according to an Emergency Contact Handling procedure supplied by the ENUM server. Be IMS may then set up an end-to-end bearer path to one or more of the emergency destination devices.

In a particular embodiment, the system includes a telephone number mapping (ENUM) server including data associated with a plurality of user accounts. The ENUM server is configured to map an emergency telephone number associated with one of the user accounts to one or more records. In a particular embodiment, each record includes a Uniform Resource Identifier (URI) associated with a corresponding emergency contact destination device and an emergency contact indicator for indicating that the URI is associated with the corresponding emergency contact destination device.

In another embodiment, a method includes receiving a query at a telephone number mapping (ENUM) server via an emergency telephone number associated with a subscriber to an emergency contact service. The method also includes retrieving from the ENUM server, in response to the query, one or more emergency contact URIs associated with the subscriber, where each emergency contact URI has an associated emergency contact indicator. The method also includes initiating routing of a communication to destination devices associated with each retrieved emergency contact URI via an Internet Protocol Multimedia Subsystem (IMS).

In another embodiment, a method includes receiving U data related to a user, where the URI data identifies a device that is associated with an emergency contact of the user. The method also includes creating a record that includes the URI data and an emergency contact indicator for indicating that the URI data is associated with the emergency contact of the user.

In another embodiment, a computer readable medium is disclosed and includes computer executable instructions to cause a processor to receive a query at a telephone number mapping (ENUM) server via an emergency telephone number associated with a subscriber to an emergency contact service. The processor retrieves from the ENUM server, one or more emergency contact URIs associated with the subscriber, where each emergency contact URI has an associated emergency identifier. The processor initiates routing of a communication to each of the one or more retrieved emergency contact URIs via an Internet Protocol Multimedia Subsystem (IMS).

FIG. 1 is a block diagram of a particular embodiment of a system 100 to provision emergency contact services in a communication network. The system 100 includes a Telephone Number Mapping (ENUM) server 102 communicating with a Home Subscriber Server (HSS) 104, and also communicating with an IP Multimedia Subsystem (IMS) 106. The system 100 may also include a representative originating device 146 and one or more destination devices 148, 154, 156, 160, and 162.

In a particular embodiment, the IMS 106 includes an originating Proxy-Call Session Control Function (P-CSCF) 142, an originating Serving-Call Session Control Function (S-CSCF) 130, an Application Server 132, a terminating I-CSCF 136, and one or more terminating S-CSCFs 140, each terminating S-CSCF 140 coupled to a corresponding terminating P-CSCF 144. Each of the terminating P-CSCFs 144 may communicate with a corresponding destination device, e.g., a Voice over Internet Protocol (VoIP) device 148.

In a particular embodiment the originating device 146 may originate a call to the originating P-CSCF 142. The call may be directed to an emergency telephone number, such as an E.164 telephone number that is designated as an emergency telephone number. The originating P-CSCF 142 may communicate the originating telephone number to the originating S-CSCF 130. The originating S-CSCF 130 communicates with the ENUM database 102.

The ENUM database 102 may look up the E.164 called telephone number in a user record to locate one or more Uniform Resource Indicators (URI) that correspond to the called E.164 telephone number. For example, a user A that subscribes to an emergency contact service may have an associated E.164 telephone number 114 and a record 112 in which the E.164 number has been recorded within the ENUM database 102. The dialed E.164 telephone number 114 may be associated with one or more URIs, such as URIs 118, which are recorded in the record 112. Each of the associated URIs 118 may correspond to a destination device, e.g., destination devices 148, 154, 156, 160, or 162. Each of the corresponding URIs may be recorded in the record 112 along with a corresponding emergency contact indicator 116 indicating that the URI is associated with a corresponding emergency contact destination device. The ENUM database 102 may verify, through communicating with the HSS 104, that the E.164 telephone number associated with the User A is registered for an emergency contact service. The HSS 104 may maintain a user record that includes an emergency identifier indicating that the E.164 telephone number is registered for emergency contact service.

Upon confirmation that the E.164 telephone number of User A is registered for emergency contact service, the ENUM database 102 returns the one or more corresponding URIs 118 to the originating S-CSCF 130. The ENUM database 102 may also return a processing indicator (not shown), indicating that the returned URIs are to be processed in accordance with a registered Emergency Contact Handling procedure. For example, the Emergency Contact Handling procedure may describe an order in which to attempt to establish contact with each of the destination devices via the corresponding URI.

The originating S-CSCF 130 may send INVITEs, such as a Session Initiation Protocol (SIP) INVITE, to the terminating I-CSCF 136, with each INVITE targeting one of the URIs 118 associated with destination devices. In a particular embodiment, an automated device can initiate a message. In a particular illustrative embodiment, an application server 132 may provide an emergency message or communication to be delivered to one or more of the destination devices being contacted. The terminating I-CSCF 136 may contact one of the terminating S-CSCFs 140. In a particular illustrative embodiment the INVITE to the terminating I-CSCF 136 may involve Session Initiation Protocol (SIP) fork INVITES, which may endeavor to establish contact with several destination devices simultaneously. A contacted terminating S-CSCF 140 may contact a terminating P-CSCF 144, which in turn may contact an associated destination device, e.g., VoIP device 148, cellular telephone device 154, home telephone 156, Personal Digital Assistant (PDA) 160, or computer 162. For example, one of the terminating P-CSCFs 144 may contact the cellular telephone 154 via a wireless network 150 and a cellular tower 152. In another example, one of the terminating P-CSCFs 144 may contact the PDA 160 via an Internet Protocol (IP) network 158. In yet another example, one of the terminating P-CSCFs 144 may contact the computer 162 via an IP network 158. In a particular illustrative embodiment, when contact is established, attempts to contact other destination devices may cease, and an end-to-end bearer path may be established between the originating device 146 and the first destination device that is engaged.

Figure 2:
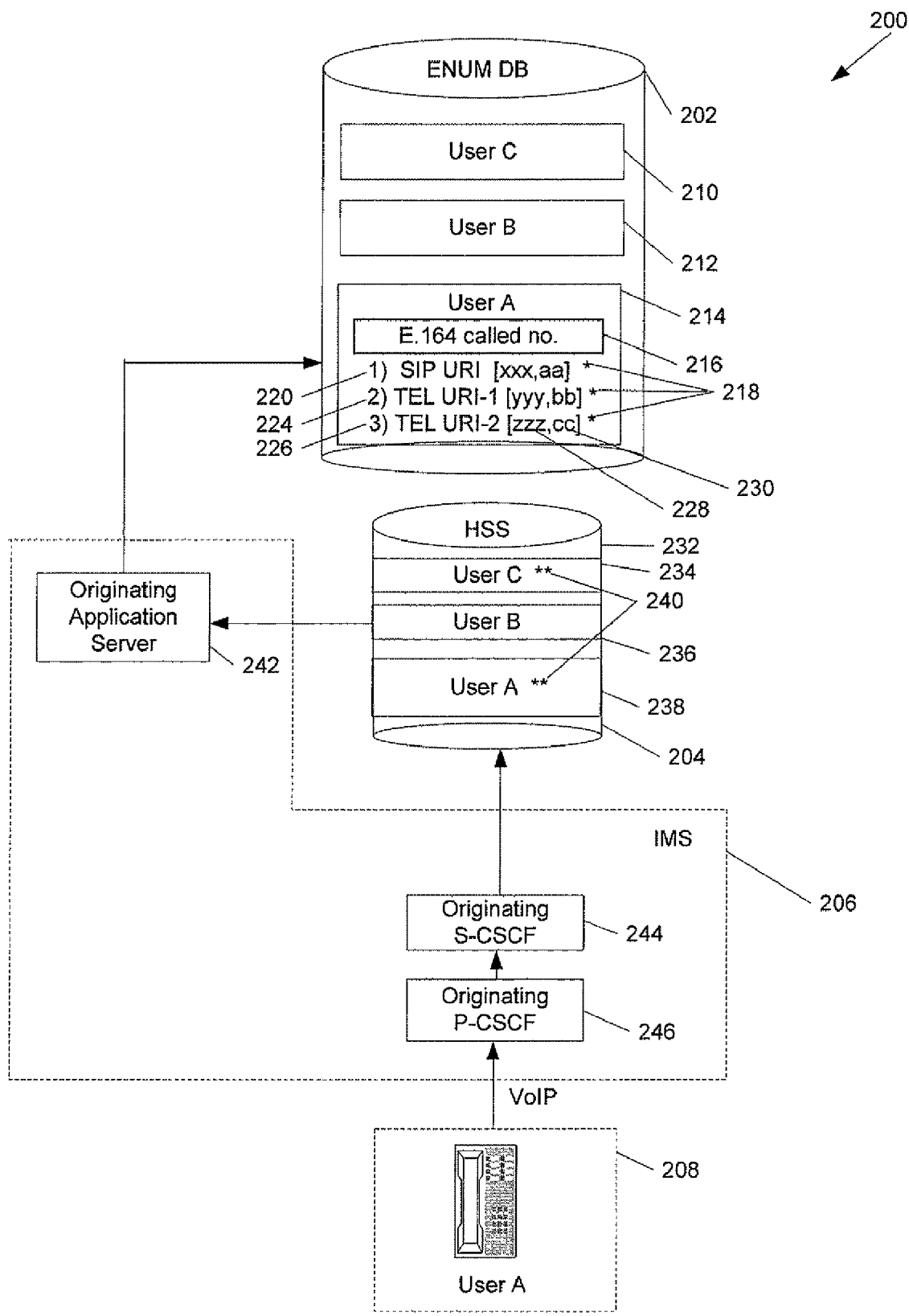
FIG. 2 is a diagram of a second particular illustrative embodiment of a system to provision emergency contact services in a communication network.

FIG. 2 is a block diagram showing a communication system 200 according to a particular embodiment. The communication system 200 includes a Telephone Number Mapping (ENUM) server 202 coupled with an IP Multimedia Subsystem (IMS) 206. The system 200 may also include a Home Subscriber Server (HSS) 232 in communication with the IMS 206, and an originating device 208, which may be a Voice-over Internet Protocol (VoIP) device. The IMS 206 may include an originating P-CSCF 246 coupled to an originating S-CSCF 244. The IMS 206 may also include an Originating Application Server 242.

In operation, a User A may set up an emergency record within the ENUM database 202 by various means, such as via a service provider application. The HSS 232 may include a user record for each user. In an illustrative embodiment, the user record includes an emergency service identifier 240 indicating that the E.164 telephone number associated with the User A is registered for emergency contact calling.

After the User A has registered for emergency contact calling, emergency data related to the User A may be provided for storage in the ENUM server 202. For example, the HSS 232 may have a first record 238 for User A, a second record 236 for User B and a third record 234 for User C. In the example, the first record 238 and the third record 234 each include an emergency service identifier 240 indicating that the emergency telephone number associated with the corresponding user account is registered for emergency contact calling, i.e., currently enabled for emergency contact calling. After the HSS 232 has verified that the first record 238 associated with User A includes the emergency service identifier 240, the HSS 232 provides the verification to an originating application server 242. The originating application server 242 may provide emergency data to the ENUM server 202, conveying the E.164 number and one or more URIs associated with corresponding emergency contact destination devices of the user to the ENUM database 202. The URIs for the destination devices may be provided using a service provider application, or from another source.

For example, the originating application server 242 may send to the ENUM database 202 the E.164 emergency contact telephone number 216, and a first URI 220, a second URI 224, and a third URI 226 for User A record 214. Each of the associated URIs may be designated with an emergency contact indicator 218 indicating that the URI is associated with a corresponding emergency contact destination device. Each of the URIs recorded in the record 214 may have an associated order data 228 and an associated preference data 230. The order data 228 specifies an order that URIs are to be processed when multiple URIs are associated with a single E.164 number. When several URIs have identical values for order data 228, the preference data 230 specifies a preferred order of processing these URIs.

Each of the other users in the database may have an associated record, e.g., record 212 for a User B and record 210 associated with User C. The ENUM database 202 may include an E.164 emergency contact telephone number for each of the users and may also include corresponding URIs for each user that subscribes to the emergency contact system by registering the E.164 telephone number for emergency contact calling. For each user that has a record in the ENUM database including an E.164 telephone number registered for emergency contact calling, the record may include one or more URIs, each associated with a corresponding emergency contact destination device.

Figure 3:
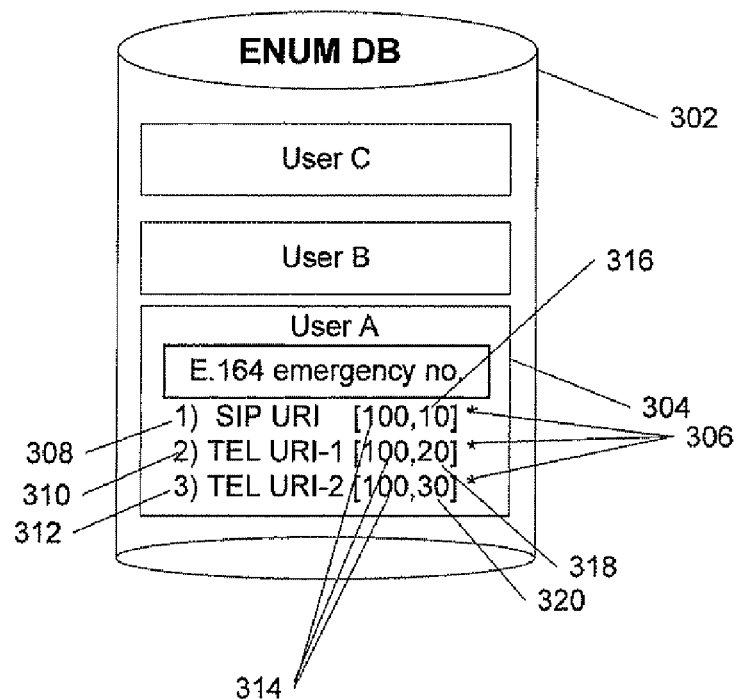
FIG. 3 is a diagram of a particular illustrative embodiment of a portion of a system to provision emergency contact services in a communication network.

FIG. 3 is a diagram of a representative ENUM database according to an illustrative embodiment. The ENUM database 302 includes records for User A, User B, and User C. A record 304 associated with User A may include a plurality of URIs associated with corresponding emergency contact destination devices. For example, a URI 308 can be a SIP URI and URIs 310 and 312 may be URIs for corresponding telephone devices. Each of the URIs 308, 310 and 312 may have an associated emergency contact indicator 306 indicating that the corresponding URI is associated with an emergency contact destination device. The URI 308 may have associated order data 314 and preference data 316. Order data 314 may represent an order in which to call the URI, and preference data 316 may represent a preference in which to call the associated URI when, for example, several URIs have equal values for their corresponding order data 314. A processing indicator (not shown) returned with the URIs indicates that the URIs are to be processed in accordance with a registered Emergency Contact Handling procedure that may be based at least in part on the order data and preference data of each URI.

For example, in FIG. 3, URIs 308, 310, and 312 each have a corresponding order data 314 with a value of 100. URI 308 has preference data 316 with a value of 10. URI 310 has preference data 318 having a value of 20. URI 312 has preference data 320 with a value of 30. In a particular illustrative embodiment, an IMS may contact destination devices in a sequential order based on URI 308 first, followed by contacting URI 310, which may be followed by contacting URI 312. In a particular illustrative embodiment, there may be a time delay between calling each of the devices identified by each of the URIs. In a particular illustrative embodiment, the URI destination devices may be contacted sequentially after an amount of time that may correspond to a difference in preference values, or may be determined at least in part from preference values. For example, the difference in preference value between URI 310 and 308 is (20−10)=10. The difference in preference value between URI 312 and 310 is a value of 10. URI 308 may receive an INVITE, followed by URI 310 after 10 seconds has elapsed, and URI 312 after an additional 10 seconds has elapsed.

Figure 4:
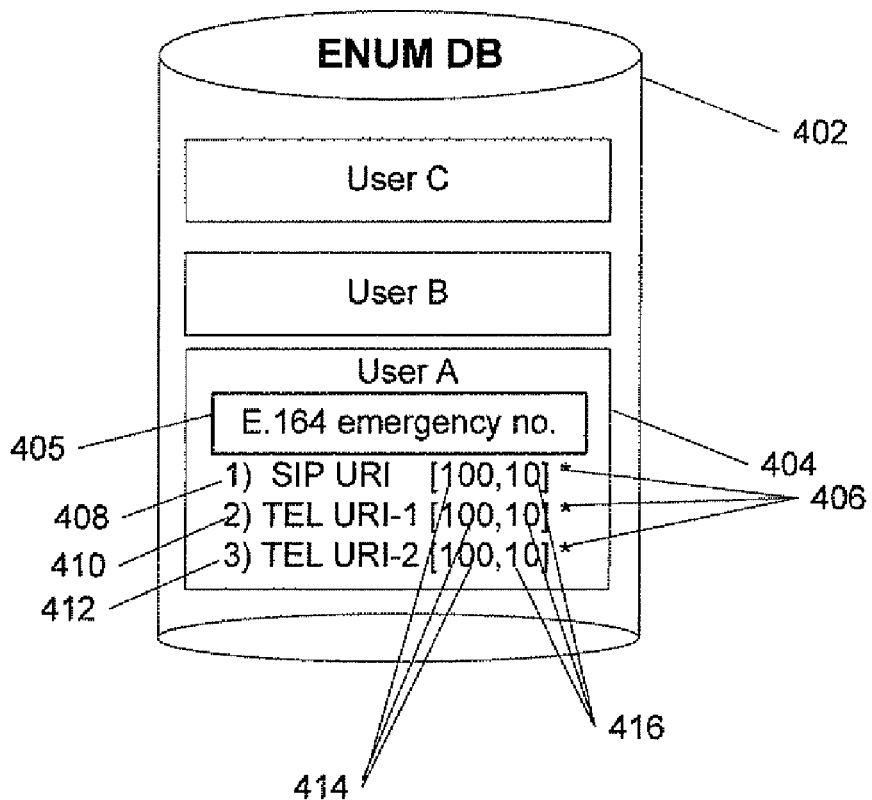
FIG. 4 is a block diagram of a second particular illustrative embodiment of a portion of a system to provision emergency contact services in a communication network.

FIG. 4 is a diagram that illustrates an ENUM database according to a second particular illustrative embodiment. The ENUM database 402 includes records for one or more users that may be subscribers to an emergency contact system. Each of the users may have an associated E.164 emergency telephone number. For example, User A may have an E.164 emergency contact telephone number 405 and three URIs 408, 410, and 412, each URI associated with a corresponding emergency contact destination device. The user may call the E.164 number in an emergency, and the ENUM database 402 may provide to an S-CSCF the URIs associated with the E.164 emergency number, e.g., URIs 408, 410, and 412. Each of the URIs 408, 410, and 412 may include an emergency contact indicator 406 indicating that the corresponding URI is associated with an emergency contact destination device. Each URI also has an order data value and a preference data value. For example, URIs 408, 410, and 412 each have an order value 414=100, and a preference value 416=10. A processing indicator (not shown) returned with the URIs may indicate that the URIs are to be processed in accordance with a registered Emergency Contact Handling procedure that may be based at least in part on the order data and the preference data of each URI. In a non-limiting illustrative embodiment, the E.164 emergency number 404 is called, and the ENUM database 402 provides the three URIs 408, 410, and 412. Since the order values are equal and the preference values are equal, the destination devices associated with each of the three URIs are contacted approximately simultaneously.

Figure 5:
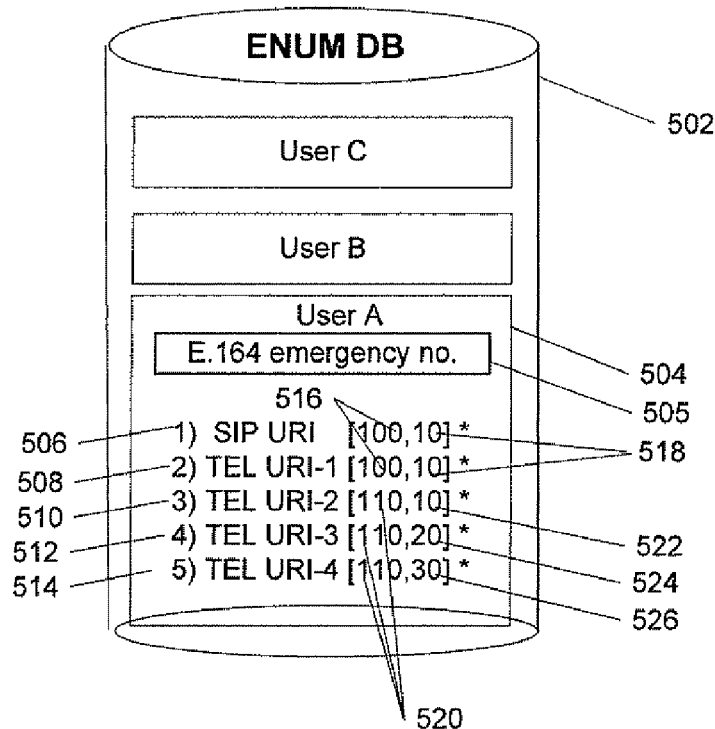
FIG. 5 is a block diagram of a third particular illustrative embodiment of a portion of a system to provision emergency contact services in a communication network.

FIG. 5 is a block diagram of another particular illustrative embodiment of an ENUM database 502. The ENUM database 502 may include records for several users including User A, User 3, and User C. A record 504 for User A includes an E.164 emergency telephone number 505 and URIs 506, 508, 510, 512 and 514. In the illustrated example, URI 506 and URI 508 each have an identical value of order data 516. In the illustrated example, URI 506 and URI 508 each have an identical value of preference data 5118. URIs 510, 512 and 514 each have an identical value of order data 520. URIs 510, 512 and 514 have corresponding preference data 522, 524, 526. In a non-limiting illustrative example, the E.164 emergency telephone number may be dialed. The ENUM database 502 is queried, and responds by providing to an IMS the five URIs within the record associated with User A and a processing indicator (not shown) indicating that the URIs are to be contacted in accordance with a registered Emergency Contact Handling procedure. Destination devices identified by URIs 506 and 508, having identical order data 516 and identical preference data 518, may be contacted approximately simultaneously. Assuming for example, that the destination devices identified by URIs 506 and 508 do not respond to a contact attempt, devices identified by URIs 510, 512 and 514, having identical values for their order number 520 and different values for their preference number 522, may be contacted sequentially. A time delay between contacting of the URIs 510, 512 and 514 may be related to preference values 522, 524 and 526.

Figure 6:
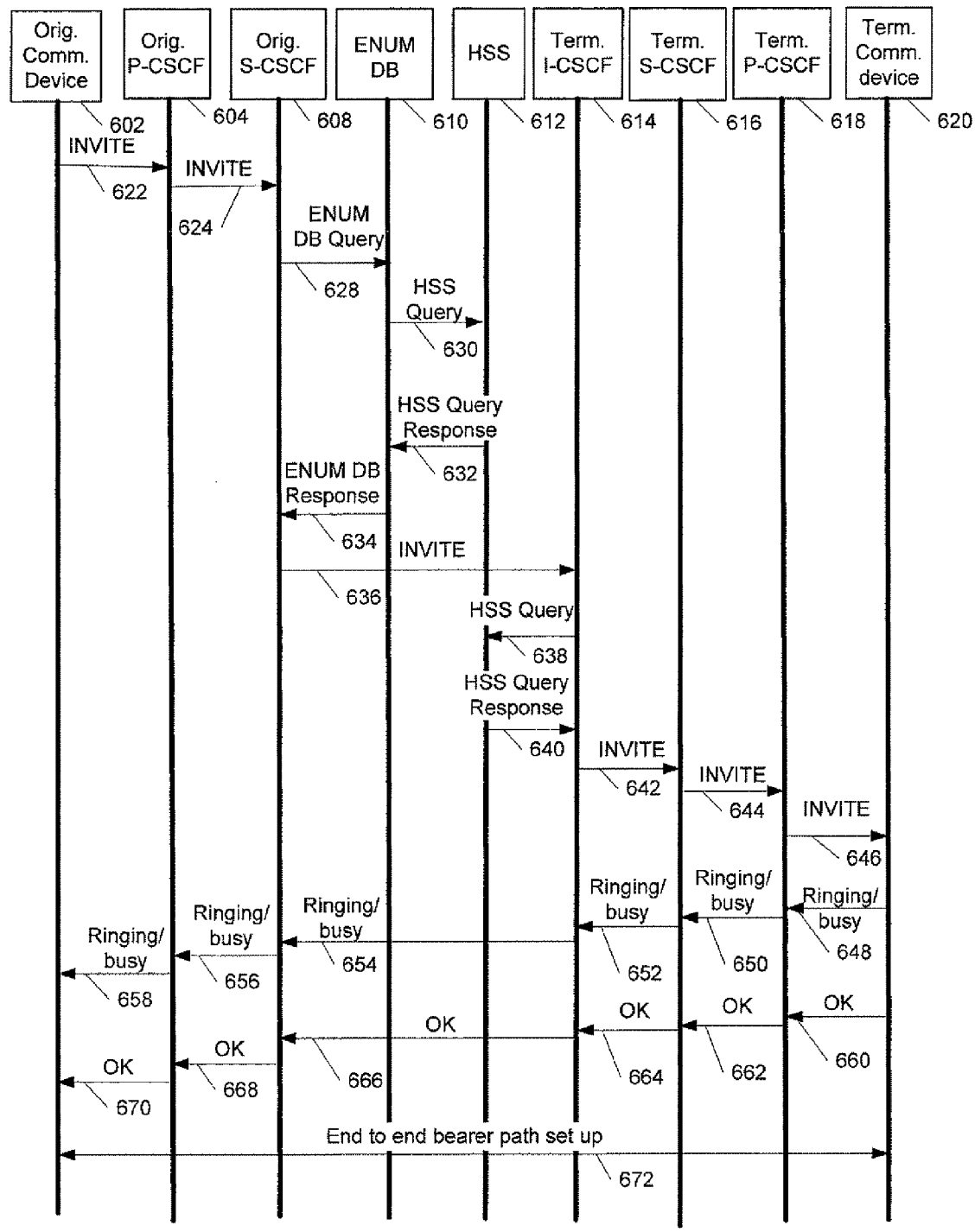
FIG. 6 is a ladder chart of a particular illustrative embodiment of a method to provision emergency contact services in a communication network.

FIG. 6 is a ladder diagram according to a particular illustrative embodiment, illustrating message flow for a method of accessing an ENUM database to contact a destination device using an emergency service. An originating communication device 602, contacts an E.164 telephone number associated with an emergency contact service of a user and initiates an INVITE 622 to an originating P-CSCF 604. The originating P-CSCF 604 sends an INVITE 624 to an originating S-CSCF 608. The originating S-CSCF 608 sends an ENUM database query 628 to an ENUM database 610. The ENUM database 610 sends a query 630 to a Home Subscribers Server (HSS) 612. A record within the HSS 612 may include an emergency service identifier corresponding to the called E.164 telephone number indicating that the E.164 telephone number is registered for emergency contact calling. The HSS 612 may respond with response 632, to the ENUM database 610 with verification that the E.164 telephone number is registered for emergency contact calling.

The ENUM database 610, having received the verification, may provide the originating S-CSCF 608 with a response 634 including URIs, each URI associated with a corresponding emergency contact destination device. The originating S-CSCF 608 may send an INVITE 636 to a terminating I-CSCF 614 to contact a selected device via a corresponding URI associated with E.164 telephone number. The terminating i-CSCF 614 may send a query 638 to the HSS 612 to determine a terminal S-CSCF 616 associated with the URI that is associated with the selected device. The HSS 612 may send a response 640 to the HSS query 638, the response 640 including the associated S-CSCF 616. The terminal I-CSCF 614 sends an INVITE 642 the corresponding terminal S-CSCFs 616 associated with the URI that is associated with the selected device.

The terminal S-CSCF 616 may send an INVITE 644 to a corresponding terminal P-CSCF 618 associated with the corresponding URI. The terminal P-CSCF 618 may send an INVITE 646 to a destination communication device 620 associated with the corresponding URI. The INVITE 646 to each of the communication devices may result in ringing or busy signal at the terminating communication device 620, which may be reported via a ringing/busy message 648 to the corresponding terminal P-CSCF 618, which sends a ringing/busy message 650 to the terminal S-CSCF 618. The terminal S-CSCF 618 sends a ringing/busy message 652 to the originating S-CSCF 608, which sends a ringing/busy message 654 to the originating P-CSCF 604, which is forwarded as a ringing/busy message 656 to the Originating Communication Device 602. The terminal communication device 620 may pick up 650 or otherwise answer the call, engaging the communication device 620. An OK message 660 may originate from the terminal communication device 620 to the terminal P-CSCF 618 indicating that the terminal communication device 620 is engaged. The terminal P-CSCF 618 may send an OK message 662 to the terminal S-CSCF 616, which may send an OK message 664 to the terminal I-CSCF 614. The terminal I-CSCF 614 may send an OK message 666 to the originating S-CSCF 608. The originating S-CSCF 608 may send an OK message 668 to the originating P-CSCF 604, which may send an OK message 670 to the originating communication device 602. After the terminal communication device 620 is engaged, ringing to other destination communication devices may be ceased. An end-to-end bearer path 672 may be set up from the originating communication device 602 to the first engaged destination communication device 620. Communications may then be transmitted. If the terminal communication device 620 is not engaged, i.e., busy or does not answer, a SIP error message may be generated at the terminal communication device 620 that may he propagated to the originating communication device 602 via a path that may include the terminal P-CSCF 618, the terminal S-CSCF 616, the terminal I-CSCF 614, the originating S-CSCF 608, and the originating P-CSCF 604. In a particular illustrative embodiment, contact with another terminal communication device 620 may be attempted, in similar fashion to the attempt to engage the terminal communication device 620. In a particular illustrative embodiment, additional attempts to contact a terminal communication device may proceed in a sequential order, which order may be established via, e.g., order and preference data associated with corresponding URIs. In another particular illustrative embodiment, attempts to contact a terminal communication device may be carried out approximately simultaneously for a plurality of terminal communication devices, such as terminal communication devices whose associated URIs have identical corresponding values of order data and preference data.

Figure 7:
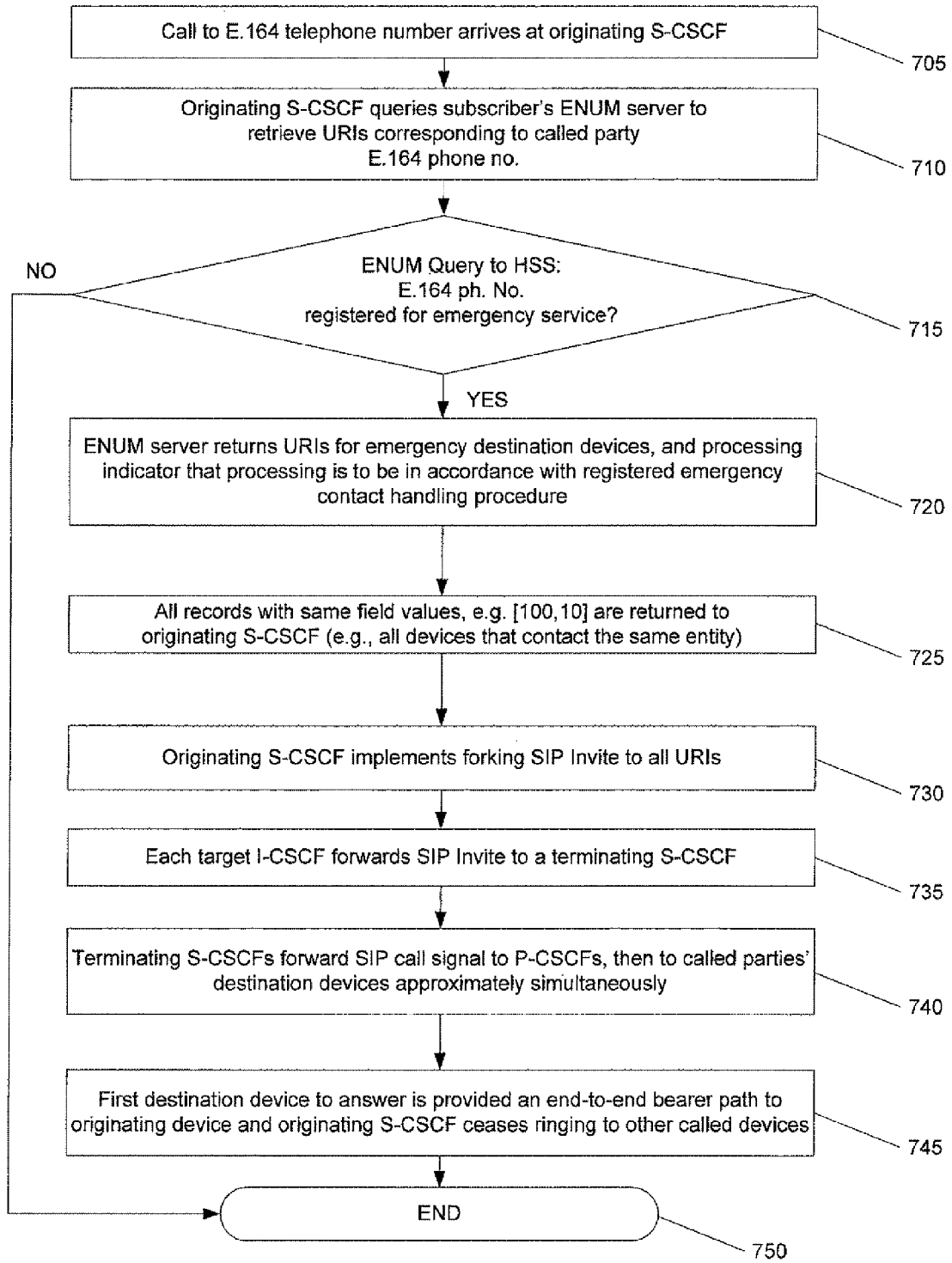
FIG. 7 is a flow chart of a first particular illustrative embodiment of a method to provision emergency contact services in a communication network.

FIG. 7 is a flow diagram according to a particular illustrative embodiment, in which corresponding order numbers and corresponding preference numbers of recorded URIs in a user record are identical. At block 705, an E.164 telephone call reaches an originating S-CSCF. Moving to block 710, the originating S-CSCF queries an ENUM server of a subscriber to an emergency contact service to retrieve URIs corresponding to an E.164 telephone number of the called party. Proceeding to decision block 715, the ENUM server queries a Home Subscriber Server (HSS) to determine if the E.164 telephone number is registered for emergency service. For instance, the HSS may store a registration status that has a value corresponding to either ACTIVE or INACTIVE for the E.164 telephone number. If the E.164 telephone number is not registered for emergency service, e.g. stored registration status has a value corresponding to INACTIVE, the method terminates at 750. If the E.164 telephone number is registered for emergency service, e.g., stored registration status has a value corresponding to ACTIVE, moving to block 720 the ENUM server returns to the S-CSCF each URI that has an associated emergency contact indicator and that is associated with a corresponding emergency destination device, and a processing indicator for indicating that processing is to be done in accordance with a registered emergency contact handling procedure. For example, the registered emergency contact handling procedure may specify an order in which to contact destination devices, e.g., sequentially or simultaneously, and the contact order may be related at least in part to order data and preference data within the URIs. Moving to block 725, all records having identical order value and identical preference value are returned to the originating S-CSCF.

In a particular non-limiting illustrative example, each of the URIs with an identical value for corresponding order number and an identical value for corresponding preference number may be associated with the same person or the same entity. Hence, contacting each of the URIs represents an attempt to contact the same person (or entity) via a different destination device. For instance, each of the URIs may be associated with a destination device to contact the subscriber's spouse.

Proceeding to block 730, the originating S-CSCF can initiate contacting of each of the associated destination devices for the URIs by implementing a forking SIP INVITE. Proceeding to block 735, each target I-CSCF of a URI forwards a call signal to a corresponding terminating S-CSCF. Moving to block 740, each terminating S-CSCF forwards a SIP INVITE to a corresponding P-CSCF, and to each of the destination devices approximately simultaneously. Moving to block 745, a first destination device to answer is provided with an end-to-end bearer path to the originating device, and ringing to other called devices is ceased by the originating S-CSCF. The method terminates at 750.

Figure 8:
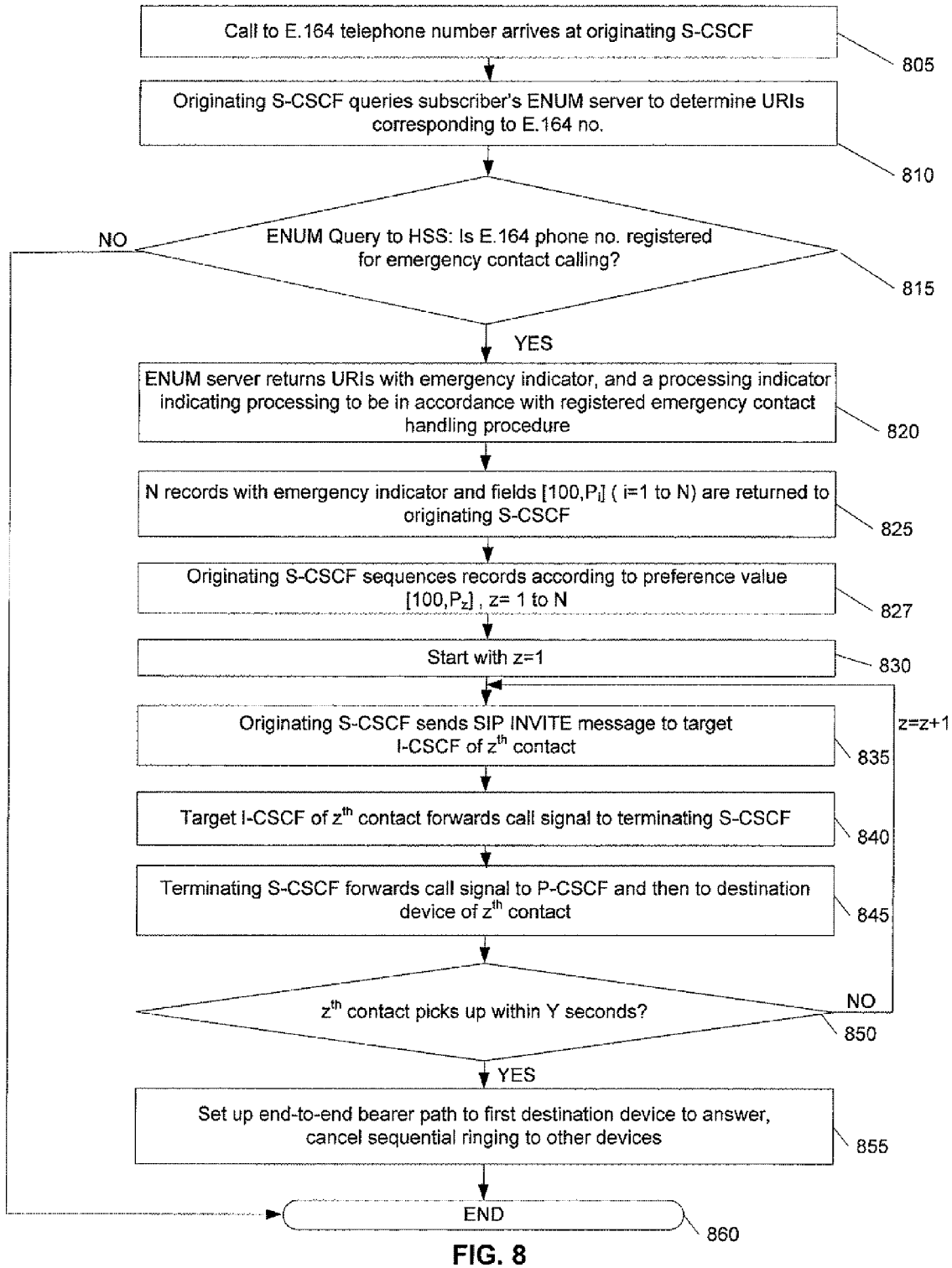
FIG. 8 is a flow chart of a second particular illustrative embodiment of a method to provision emergency contact services in a communication network.

FIG. 8 is a flow chart of a method according to a particular illustrative embodiment, in which corresponding order numbers of URIs in a user record are identical and corresponding preference numbers differ. At block 805, a call to an E.164 telephone number is received at an originating S-CSCF. Moving to block 810, the originating S-CSCF queries a subscriber's ENUM server to determine URIs corresponding to the called E.164 telephone number. Proceeding to decision block 815, the ENUM database queries a Home Subscriber Server (HSS) to determine if the E.164 telephone number is registered for emergency contact calling. If the E.164 telephone number is not registered for emergency contact calling, the method terminates at 860. If the E.164 telephone number is registered for emergency contact calling, the method proceeds to block 820. For instance, the HSS may store a registration status that has a value corresponding to either ACTIVE or INACTIVE for the E.164 telephone number. If the E.164 telephone number is not registered for emergency service, e.g. stored registration status has a value corresponding to INACTIVE, the method terminates at 860. If the E.164 telephone number is registered for emergency service, e.g., stored registration status has a value corresponding to ACTIVE, the method proceeds to block 820. At block 820, the ENUM server returns URIs having an emergency contact indicator (indicating association with an emergency destination device) to the originating S-CSCF. The ENUM server also returns a processing indicator indicating that processing is to be carried out in accordance with a registered emergency contact handling procedure.

Proceeding to block 825, the ENUM server supplies records (a total of N records are supplied) of the URIs that have an order field that is identical and preference values $P_i$ (i=1 to N) that differ. Continuing to block 827, the originating S-CSCF sequences the N records according to preference value, forming a sequence of records with fields $[100, P_z]$ (z=1 to N) (using an index z, where z corresponds to a position in the sequence), in which a smaller value of z corresponds to a more preferential contact. In block 830, the method begins with the record corresponding to z=1, corresponding to the most preferential contact of the N records supplied. In an illustrative embodiment, the lower the preference value, the more preferential the contact, and the earlier the record will be situated in the sequence i.e., smaller value of corresponding z. Proceeding to block 835, the originating S-CSCF sends a SIP INVITE message to a target I-CSCF of the $z^{th}$ URI in the sequence. Moving to block 840, the target I-CSCF of the $z^{th}$ URI forwards the INVITE to a terminating S-CSCF. Proceeding to 845, the terminating S-CSCF forwards the INVITE to a proxy P-CSCF, and then to the $z^{th}$ destination device, which is the destination device associated with the $z^{th}$ URI. Moving to decision block 850, the originating S-CSCF waits to see if the $z^{th}$ destination device answers within Y seconds. (In an illustrative example, Y can be set equal to a constant. In a particular illustrative example, Y may be set to a constant such as 10 seconds. In another illustrative example, Y may be set to a constant multiplied by a difference between successive preference values.) If the $z^{th}$ device engages (i.e., answers) within Y seconds of ringing, the method sets up an end-to-end bearer path from the destination device to the originating device and cancels ringing to all subsequent devices. If the $z^{th}$ device does not engage within Y seconds, then the method returns to block 835 and adds one to the value of z. For example, adding one to the value of z results in sending an INVITE to the URI having a next higher sequential value for the preference data. The method proceeds to block 835, sending a SIP INVITE to the target I-CSCF of the $z^{th}$ URI. The method then proceeds to block 840, in which the target I-CSCF of the new $z^{th}$ URI forwards the call signal to the terminating S-CSCF. The method proceeds to block 845, forwarding the call to an associated P-CSCF of the $z^{th}$ URI and then to the $z^{th}$ destination device. The method proceeds sequentially through each of the URIs until one of the devices engages contact or until all N devices have been tried. When one of the devices has engaged contact, attempts to all other sequential URIs cease. The method ends at block 860.

Figure 9:
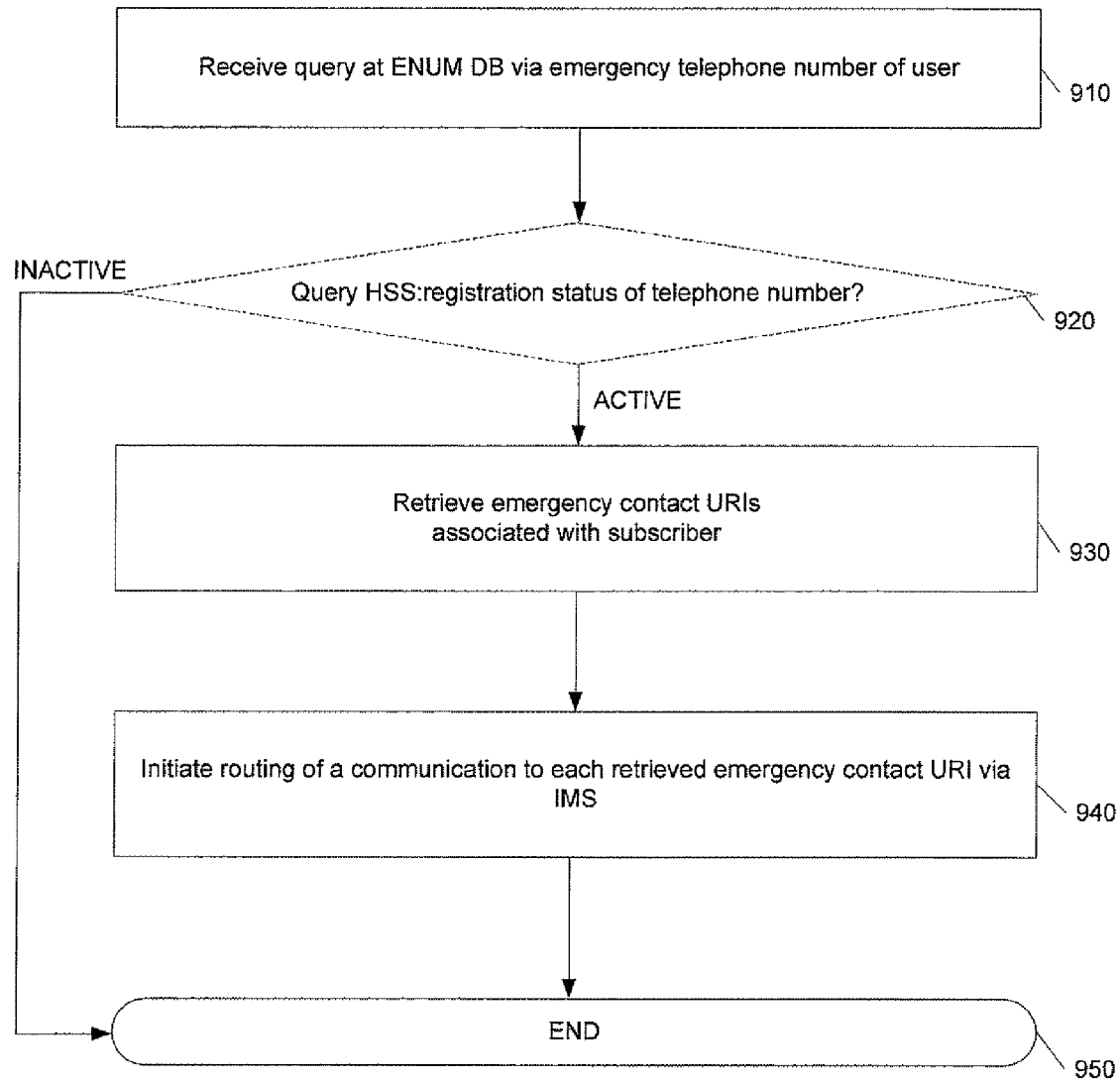
FIG. 9 is a flow chart of a third particular illustrative embodiment of a method to provision emergency contact services in a communication network.

FIG. 9 is a flow diagram of a method of URI access and destination device routing, according to a particular embodiment. At block 910, an ENUM database receives a query via an emergency telephone number of a user. Proceeding to optional block 920, the ENUM database optionally queries an HSS database to verify a current registration status of the emergency telephone number of the user. If the registration status is INACTIVE, the method terminates at 950. If the registration status is ACTIVE, the method proceeds to block 930, and the ENUM database retrieves emergency contact URIs associated with the subscriber. Proceeding to block 940, the method initiates routing of a communication to each destination device identified by each of the retrieved emergency contact URIs via an IMS. The method terminates at 950.

Figure 10:
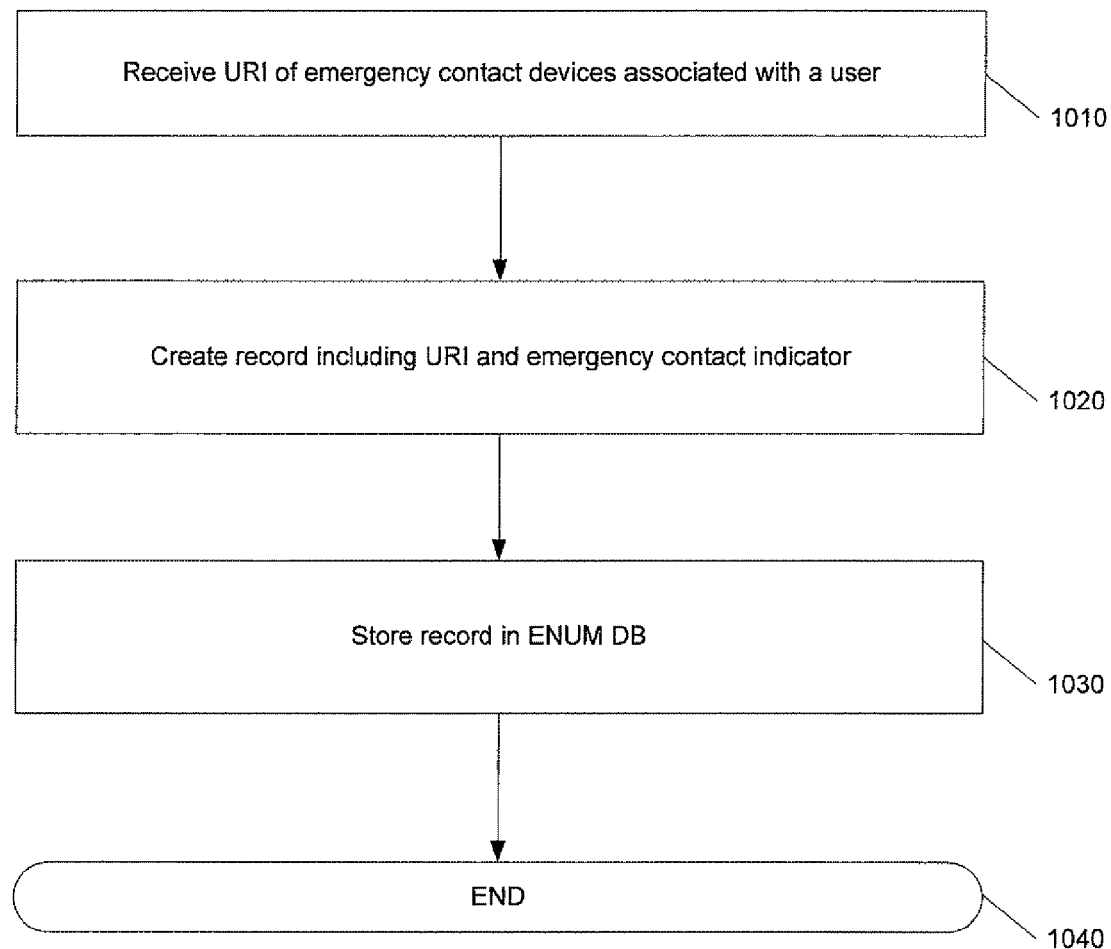
FIG. 10 is a flow chart of a particular illustrative embodiment of a method to store emergency contact information into a telephone number mapping (ENUM) database in a communication network.

FIG. 10 is a flow diagram according to a particular embodiment of a method of provisioning an emergency service by initializing an ENUM database. At block 1010, one or more URIs of emergency contact devices associated with a user are received. For example, a user who has registered for an emergency calling service may provide an E.164 emergency telephone number and one or more URIs associated with emergency destination devices associated with the user, such as communication devices of family members, physicians, or other emergency contact persons or entities. Moving to block 1020, a record is created that includes each URI and a corresponding emergency contact indicator to indicate that the URI is associated with one of the user's emergency destination devices. Proceeding to block 1030, the record is stored in an ENUM database. The method terminates at 1040. The method can be repeated for each user that has registered for the emergency contact service.

In conjunction with the configuration of structure described herein, the system and method disclosed allows a user to provide emergency contact URIs, where each URI is associated with an emergency destination device. The URIs may be stored in a record associated with the user, and the record may also include an E.164 telephone number that may serve as an emergency telephone number associated with the user. Each of the URIs may be stored in the record along with a corresponding emergency contact indicator indicating that the URI is associated with a corresponding emergency contact destination device. Each URI can have a first field (order field) containing a first field value (order data), and a second field (preference field) containing a second field value (preference data). In a particular embodiment, the first field value is related to a primary sequential order to contact the corresponding destination devices. When a subset of the URIs have an identical first field value, the second field value is related to a secondary sequential order to contact the corresponding destination devices.

The user may also have an account record stored in a Home Subscriber Server and the account may include an identifier, such as an emergency service subscription identifier (also emergency service identifier herein), indicating whether the emergency service telephone number associated with the user account is registered for emergency contact calling, i.e., the user account is currently enabled for emergency contact calling. For example, a record in an ENUM database for a User A may include an E.164 telephone number serving as an emergency telephone number. The HSS may include an account record for the User A and the account record may include an emergency service identifier indicating that the E.164 emergency telephone number associated with User A is registered for emergency contact calling.

In an illustrative example, a call may be placed to the E.164 emergency telephone number associated with the User A, and an IMS system may query the ENUM database for URIs associated with the E.164 telephone number of the User A. The ENUM database may query the HSS that includes the account record for User A to verify that the E.164 telephone number is registered for emergency contact calling. After receiving the verification, the ENUM database may provide URIs associated with corresponding emergency contact devices for User A to the IMS. The ENUM database may also provide a processing indicator indicating that the URIs are to be processed according to an Emergency Contact Handling Procedure. The IMS may contact each of the emergency contact destination devices via their corresponding URIs. Depending on associated data for each of the URIs, e.g., order and preference data values, the IMS may contact the URIs sequentially, approximately simultaneously, or via a mixture of sequential and simultaneous contacting. The sequence of contacting URIs may be executed based at least in part on the Emergency Contact Handling Procedure.

In a particular illustrative example, the first emergency contact destination device to be engaged results in all attempts to contact other URIs being canceled. An end-to-end bearer path may be set up between the originating communication device and the destination communication device. In a particular illustrative example, a communication, e.g., a pre-recorded message, may be sent to the destination communication device that is engaged. The communication may be provided by an application server of the IMS, or by another source.

Destination devices may include VoIP devices, cellular telephones via wireless network, home telephone via e.g., VoIP, PSTN, or another means, Personal Digital Assistants via an IP network, computers via IP network, or other destination devices. The communication provided to the destination device may be a pre-recorded message, an instant message (IM), electronic mail (E-Mail), a page via a pager, or another message.

In a particular illustrative example, if several URIs are attempted to be contacted simultaneously, each of these URIs may be associated with a single entity, e.g., a single person. By doing so, the system is attempting to contact that single person by a numbers of different destination devices.

Figure 11:
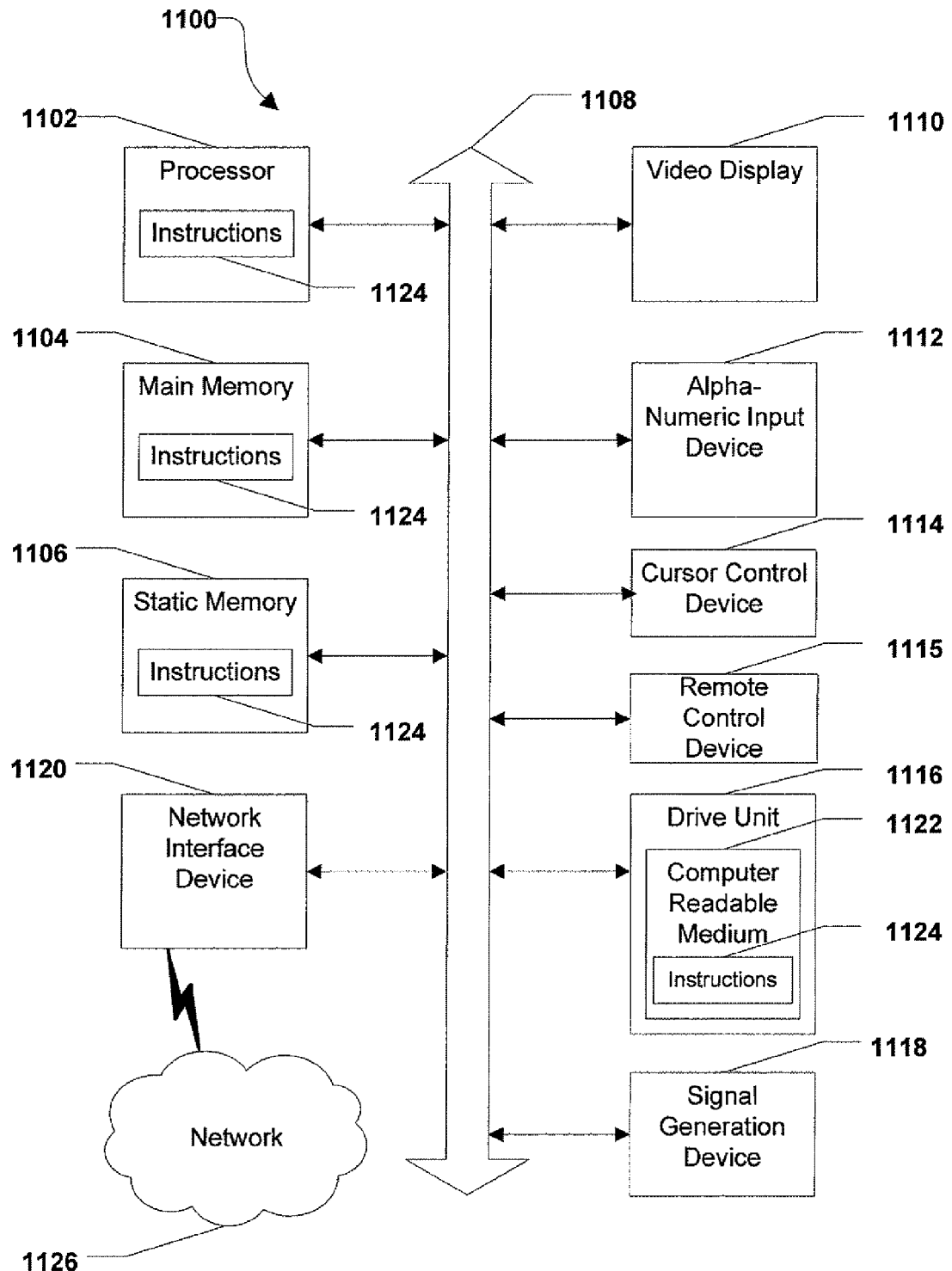
FIG. 11 is a general diagram of a particular illustrative embodiment of a computer system.

FIG. 11 is a general diagram of a particular illustrative embodiment of a computer system 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a content source, network management system, a server, set-top box device, or network switch. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106, which can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, a cursor control device 1114, such as a mouse, and a remote control device 1115. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A communication system comprising:
    a telephone number mapping server comprising data associated with a plurality of user accounts, the telephone number mapping server configured to map an emergency telephone number associated with one of the user accounts to one or more records, wherein each of the one or more records includes:
        a uniform resource identifier associated with a corresponding emergency contact destination device; and
        an emergency contact indicator to indicate that the uniform resource identifier is associated with the corresponding emergency contact destination device.

2. The communication system of claim 1, wherein at least one of the uniform resource identifiers is a session initiation protocol uniform resource identifier of a voice over internet protocol destination device.

3. The communication system of claim 1, wherein the user account includes an emergency service identifier to indicate whether the emergency telephone number associated with the user account is registered for emergency contact calling.

4. The communication system of claim 3, further comprising a serving call session control function configured to:
    initiate a query to the telephone number mapping server via the emergency telephone number;
    receive, in response to the query, one or more uniform resource identifiers extracted from the records to which the emergency telephone number is mapped that include the emergency contact indicator when the emergency service identifier indicates that the emergency telephone number associated with the user account is registered for emergency contact calling; and
    initiate contact with one or more destination devices corresponding to the received uniform resource identifiers via the corresponding uniform resource identifier.

5. The communication system of claim 4, wherein each of the received uniform resource identifiers has an associated first field comprising a first field value, and wherein the first field value is related to a primary sequential order to contact the corresponding destination devices.

6. The communication system of claim 5, wherein each of the received uniform resource identifiers has an associated second field comprising a second field value, and wherein when a first subset of the uniform resource identifiers have an identical first field value, the second field value is related to a secondary sequential order to contact the corresponding destination devices.

7. The communication system of claim 6, wherein when a second subset of uniform resource identifiers have identical first field values and also have identical second field values, contact with the corresponding destination devices is initiated approximately simultaneously.

8. The communication system of claim 4, wherein, upon establishing contact with the destination device associated with a particular one of the received uniform resource identifiers a bearer path is set up to the destination device, and initiating contact with other destination devices ceases.

9. The communication system of claim 3, wherein the telephone number mapping server is further configured to:
retrieve one or more uniform resource identifiers from the records that include an emergency contact indicator in response to a query received by the telephone number mapping server; and
provide the uniform resource identifiers when the emergency service identifier indicates that the emergency telephone number associated with the user account is registered for emergency contact calling.

10. The communication system of claim 9, further comprising a home subscriber server storing the emergency service identifier.

11. A method comprising:
receiving a query at a telephone number mapping server, the query identifying an emergency telephone number associated with a subscriber to an emergency contact service;
retrieving from the telephone number mapping server, in response to the query, one or more emergency contact uniform resource identifiers associated with the subscriber, wherein each of the emergency contact uniform resource identifiers has an associated emergency contact indicator; and
initiating routing of a communication to destination devices associated with each retrieved emergency contact uniform resource identifier via an internet protocol multimedia subsystem.

12. The method of claim 11, further comprising verifying that the emergency telephone number is registered for emergency contact calling before retrieving the one or more emergency contact uniform resource identifiers from the telephone number mapping server.

13. The method of claim 11, further comprising determining a sequential order in which to initiate routing of the communication to the destination devices, wherein the sequential order is based on corresponding data fields associated with each of the retrieved emergency contact uniform resource identifiers.

14. The method of claim 13, wherein:
the corresponding data fields comprise a first field having a first field value and a second field having a second field value; and
a first subset of the retrieved uniform resource identifiers have the same first field value, and the sequential order is related to the second field value.

15. The method of claim 13, wherein:
the corresponding data fields comprise a first field having a first field value and a second field having a second field value; and
each uniform resource identifier of a second subset of the retrieved uniform resource identifiers have the same first field value and wherein uniform resource identifiers of the second subset have the identical second field value, and wherein the routing is initiated to each uniform resource identifier in the second subset approximately simultaneously.

16. The method of claim 15, wherein each uniform resource identifier of the second subset is associated with a single entity.

17. A method comprising:
receiving, at a telephone number mapping server, uniform resource identifier data related to a user, wherein the uniform resource identifier data is associated with a device that is associated with an emergency contact of the user; and
storing a record in the telephone number mapping server that includes the uniform resource identifier data and an emergency contact indicator indicating that the uniform resource identifier data is associated with the emergency contact of the user.

18. The method of claim 17, further comprising:
associating an emergency telephone number with the user;
wherein when the emergency telephone number is engaged and the emergency telephone number is registered for emergency contact calling, contact is initiated with the device via the corresponding uniform resource identifier data.

19. The method of claim 18, further comprising initiating routing of a communication to the device via the corresponding uniform resource identifier data.

20. The method of claim 18, further comprising:
including a registration status of the emergency telephone number in a user account, wherein the registration status comprises active or inactive; and
verifying that the registration status is active before initiating contact with the device.

21. The method of claim 18, further comprising:
receiving, from an originating serving call session control function, a query to the emergency telephone number;
providing to the originating serving call session control function from the telephone number mapping server, the uniform resource identifier data associated with each device that is associated with the corresponding emergency contact of the user; and
initiating contact with each device associated with the emergency contact of the user in a sequential order related to an order field and a preference field of the uniform resource identifier data.

22. A non-transitory computer readable medium including computer executable instructions to cause a processor to:
receive a query at a telephone number mapping server via an emergency telephone number associated with a subscriber to an emergency contact service;
retrieve from the telephone number mapping server, in response to the query, one or more emergency contact uniform resource identifiers associated with the subscriber, wherein each emergency contact uniform resource identifier has an associated emergency identifier; and
initiate routing of a communication to each of the one or more retrieved emergency contact uniform resource identifiers via an interne protocol multimedia subsystem.

23. The non-transitory computer readable medium of claim 22, wherein the communication comprises an email message.

24. The non-transitory computer readable medium of claim 22, wherein the communication comprises an instant message.

25. The non-transitory computer readable medium of claim 22, wherein the communication comprises a page.

* * * * *